W. W. SLOCUM.
GAME APPARATUS.
APPLICATION FILED FEB. 23, 1909.

931,020.

Patented Aug. 10, 1909.

WITNESSES:
A. M. Shannon.
A. M. Dorr.

INVENTOR
WILLIAM W. SLOCUM,
BY
ATTORNEYS.

UNITED STATES PATENT OFFICE.

WILLIAM W. SLOCUM, OF DETROIT, MICHIGAN.

GAME APPARATUS.

No. 931,020.  Specification of Letters Patent.  Patented Aug. 10, 1909.

Application filed February 23, 1909. Serial No. 479,541.

*To all whom it may concern:*

Be it known that I, WILLIAM W. SLOCUM, a subject of the King of England, residing at Detroit, in the county of Wayne and State of Michigan, have invented certain new and useful Improvements in Game Apparatus, of which the following is a specification, reference being had therein to the accompanying drawings.

This invention relates to game apparatus and more especially to one of the educational type and consists in the matters hereinafter set forth and more particularly pointed out in the appended claims.

Figure 2:
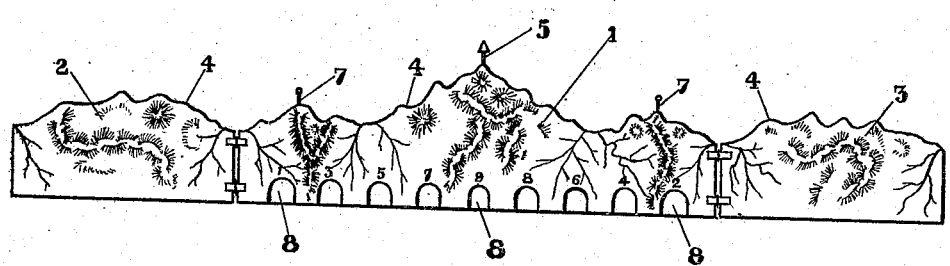
Figure 1:
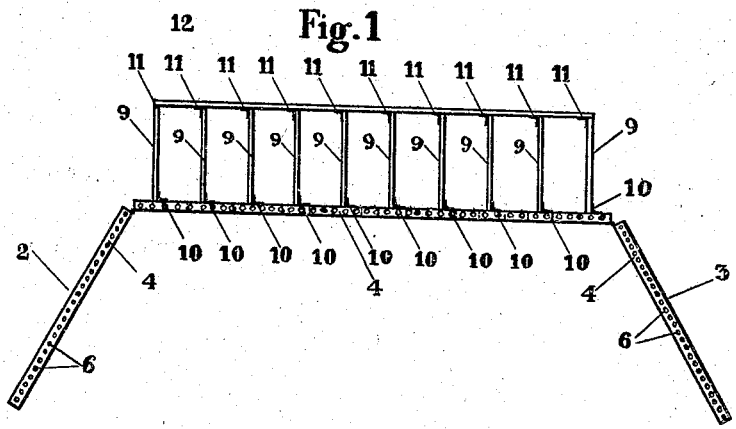

In the drawings, Figure 1 is a plan view of the game apparatus in operative position, Fig. 2 is a front elevation thereof with side wings extended for clear view.

Referring to the drawings, 1 indicates a center board having a representation of an ordinary map on its face and provided with wing boards 2 and 3 hinged thereto at the ends so as to fold against the center board, the map on the face of the center board being extended across the wings. The upper edge or margin 4 of the wings and center board is cut to represent the profile map or section of the plane map shown on the face of the wings and board. The map is so disposed at the highest elevation of the profile that it comes at about the center of the board 1 and is marked by a suitable pointer 5. A series of perforations 6 are formed at regular intervals along the profile edges of the wings and board in which counting pegs 7 may be inserted after the manner of pegs in a cribbage board. The lower edges of the wings and center board are adapted to rest on a table or other plane surface and a series of notches 8 are formed in the center board at regular intervals with numerals over them giving different values for each notch as indicated. A series of retaining pockets are formed back of the center board and attached thereto, preferably by parallel strips 9 connected by hinges 10 to the center board and by other hinges 11 to a back board 12 so as to break or fold closely against the center board if desired.

In operation, the board is mounted as shown in Fig. 1 on a plane surface such as a table or the like and the players alternately attempted to roll a ball of proper size through the apertures of the center board, counting the result by the markers in the aperture of the profile map, the winner being the one whose marker reaches the center of the board first.

Obviously, changes in the details of construction may be made without departing from the spirit of the invention, and I do not care to limit myself to any particular form or arrangement of parts.

What I claim as my invention is:—

1. A game apparatus comprising a center board, wing boards pivotally secured to the ends thereof and adapted to fold against it, said center and wing boards having a plane map on their front faces and having their upper edges cut to represent a profile map corresponding in contour to the plane map, and being provided in their upper margins with a series of perforations, the center board having notches formed in its lower margin, and extendible means secured to the back of the center board behind each notch and adapted when extended to arrest and retain a ball thrown through the notch.

2. A game apparatus comprising a center board, wing boards on the ends thereof, the lower margins of the center board having notches therein and the upper edges of the center and wing boards being cut to represent a profile map corresponding to a plane map represented on the front faces of the center and wing boards and having a series of counting perforations therein, parallel strips extending from the rear face of the center board and alternating with the notches and a back board connecting the outer ends of the strips, the strips and backboard being adapted to fold flat against the center board.

3. A game apparatus comprising a center board, wing boards on the ends thereof, the lower margins of the center board having notches therein and the upper edges of the center and wing boards being cut to represent a profile map corresponding to a plane map represented on the front faces of the center and wing boards and having a series of perforations therein, parallel strips extending from the rear face of the center board alternating with the notches and a back board connecting the outer ends of the strips, the strips and back board being pivotally secured to the center board to fold against its back face, and the wings being adapted to fold against the front face of the center board.

4. A game apparatus comprising a center board having notches in its lower edges, wing boards pivotally secured to the ends of the center board and adapted to fold flat against the front side thereof, the lower margins of the wing boards and center board lying in the same plane and the upper margins of the wing and center boards having a row of equally spaced perforations extending from end to end thereof.

In testimony whereof I affix my signature in presence of two witnesses.

WILLIAM W. SLOCUM.

Witnesses:
A. M. SHANNON,
C. R. STICKNEY.